US011531660B2

(12) United States Patent
Wilton et al.

(10) Patent No.: US 11,531,660 B2
(45) Date of Patent: Dec. 20, 2022

(54) ANALYZING DATA MODULE VERSIONS FOR ALIASES AND BACKWARDS COMPATIBILITY

(71) Applicant: Cisco Technology, Inc., San Jose, CA (US)

(72) Inventors: Robert George Wilton, Hertfordshire (GB); Reshad Rahman, Ottawa (CA); Joseph Michael Clarke, Cary, NC (US); Paul Henry Merlo, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/235,247

(22) Filed: Apr. 20, 2021

(65) Prior Publication Data

US 2022/0335024 A1 Oct. 20, 2022

(51) Int. Cl.
G06F 16/00 (2019.01)
G06F 16/21 (2019.01)
(52) U.S. Cl.
CPC .................................. *G06F 16/219* (2019.01)
(58) Field of Classification Search
CPC ....................................................... G06F 16/219
See application file for complete search history.

(56) References Cited

U.S. PATENT DOCUMENTS

| 6,487,713 | B1* | 11/2002 | Cohen ....................... G06F 8/71 717/105 |
| 7,506,336 | B1* | 3/2009 | Ninan ....................... G06F 8/65 707/999.203 |
| 7,765,194 | B1* | 7/2010 | Sharma ............... G06F 9/44536 707/695 |
| 9,253,233 | B2* | 2/2016 | Luby ....................... H04L 65/80 |
| 2011/0214114 | A1* | 9/2011 | Vidal ........................ G06F 8/71 717/170 |
| 2012/0222025 | A1* | 8/2012 | Pandit ..................... G06F 8/658 717/170 |
| 2017/0078158 | A1* | 3/2017 | Dec .......................... G06F 11/30 |
| 2019/0114165 | A1 | 4/2019 | Ghiondea et al. |
| 2019/0243915 | A1* | 8/2019 | Raghavan ............... H04L 43/08 |
| 2020/0097300 | A1 | 3/2020 | Goetz et al. |

OTHER PUBLICATIONS

Kristian Larsson, YANG versioning and backwarrds Network Automation ramblings, Jul. 4, 2016, 7 pages.
Ed J. Clarke, "YANG Module Versioning Requirements", IETF.org, Jun. 29, 2020, 12 Pages.

\* cited by examiner

*Primary Examiner* — Anhtai V Tran
(74) *Attorney, Agent, or Firm* — Lee & Hayes, P.C.

(57) ABSTRACT

A method includes determining whether the first version is an alias with respect to the second version, the alias being defined as an equivalent version of the YANG module. Based at least in part on a determination that the first version is the alias with respect to the second version, a version alias extension is inserted into a revision label of the first and/or second version. Based on a determination that the second version is backwards compatible with respect to the first version, a version backwards compatible extension is inserted into the revision label of the second version. Based at least in part on a determination that the second version is not backwards compatible with respect to the first version, a version non-backwards compatible extension is inserted into the revision label of the second version.

20 Claims, 8 Drawing Sheets

ANALYZING DATA MODULE VERSIONS FOR ALIASES AND BACKWARDS COMPATIBILITY

TECHNICAL FIELD

The present disclosure relates generally to computer networks and network management. Specifically, the present disclosure relates to systems and methods for data modeling language versioning and aliasing of data modeling language versions.

BACKGROUND

Computer networking has become ubiquitous throughout the world as a means of transmitting, processing, and/or storing data. Network management servers (NMSs) may be used to manage a number of managed devices (e.g., client devices) within a network. The NMSs may utilize a number of different versions of the YANG data modeling language to define data sent over network management protocols such as, for example, the network configuration (NETCONF) protocol and the RESTCONF hypertext transfer protocol-related protocol.

A YANG module may be labeled with a module name and a module revision date (e.g., year, month, day) to identify, track, and chronicle the revision of the YANG module. The Internet Engineering Task Force (IETF) has defined the YANG syntax to preclude any non-backwards-compatible (NBC) changes introduced into the YANG modules to ensure that later revisions of the YANG module may be functional in any instantiation of any revision of the YANG module. However, in practice, vendors may find the rigid constraints precluding any NBC changes to the YANG module since the vendors' platform may be tightly coupled with a revision of the YANG module and changes in those vendor platforms may create a situation where the platform YANG module becomes NBC to other revisions of the YANG module. There does not exist in the YANG data modeling language a way to indicate that NBC changes have occurred. Further, there does not exist in the YANG data modeling language a way for a module author to indicate the requirement for a specific version of a YANG module or later or a basic minimum version of the YANG module. It may be possible to import the YANG module at any revision or a specific revision of the YANG module (and only that specific revision). However, the ability to import only these types of revisions of the YANG module may result in too loose or too tight of a YANG module structure to fit the vendor's requirements.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
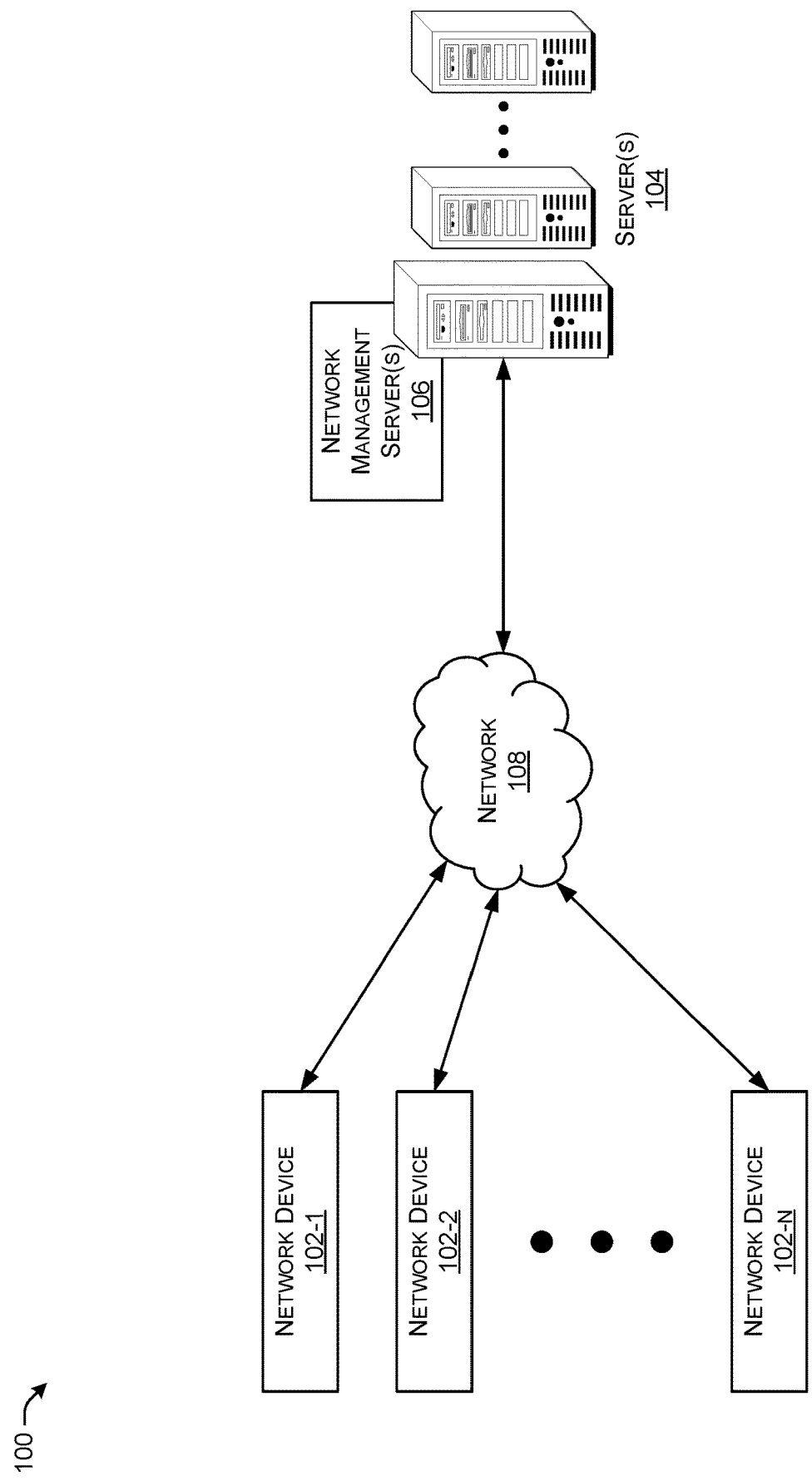
FIG. 1 illustrates a system-architecture diagram of a network management system that utilizes a network management server, according to an example of the principles described herein.

As noted above, there is a need for a standard mechanism to expose which YANG module versions are NBC (or backwards-compatible (BC)) for a specific application or scenario. The present systems and methods provide for the defining of YANG module lineages, tooling that allows for the determination as to whether a specific YANG module version was derived from another version of the YANG module and tagging of the different revisions of the YANG modules that indicate whether NBC changes have been made. Further, the present systems and methods provide for revision labeling to allow a human user to identify, via the revision labels presented in a semantic layout of the revisioning history of the YANG module, which revisions of the YANG module include non-backwards compatible (NBC), backwards compatible (BC), and/or editorial changes to the YANG module.

The systems and methods described herein addresses shortcomings of YANG semantic versioning. A client device and/or human user may be able to see NBC relationships between YANG modules, BC relationships between YANG modules, editorial changes to a YANG module, and aliases or identical schema between different revisions of YANG modules which may otherwise require a statement-by-statement full schema comparison.

Overview

The present disclosure describes methods, systems, and non-transitory computer-readable medium storing instructions that, when executed, causes a processor to perform operations to analyze data modules (e.g., YANG modules) for aliases and backwards compatibility. YANG module versioning and YANG semantic versioning specification (e.g., "YANG SemVer versioning scheme") specify how to document non-backwards-compatible (NBC), backwards-compatible (BC) and editorial changes to a YANG module. This allows a network device consuming YANG modules to be aware of the nature of any changes in a new release.

YANG is a data modeling language used in defining data sent between a number of network elements (e.g., computing devices within a network) using one or more network management protocols. YANG data modeling language may be used to model configuration data and/or state data of various computing devices within the network. YANG data modeling language is protocol independent such that it may be converted into any encoding format such as, for example, extensible markup language (XML) or Javascript Object Notation (JSON) encoding formats.

Further, the YANG data modeling language is maintained by the Network Modeling (NETMOD) working group in the Internet Engineering Task Force (IETF) and is published as request for comment (RFC) 6020 and RFC 7950, the entirety of which are incorporated herein by reference.

A YANG library provides information about YANG modules, datastores, and datastore schemas used by a network management server (NMS). Caching mechanisms are provided to allow network devices communicatively coupled to the NMS to minimize retrieval of this information. The YANG library supports the Network Management Datastore Architecture (NMDA) by listing all datastores supported by an NMS and the schema that is used by each of these datastores. The YANG library is described in RFC 8525, the entirety of which are incorporated herein by reference. YANG-SemVer versioning scheme allows branching within a version tree including a number of versions of a YANG module such as, for example, updating a revision of the YANG module which is not the latest revision.

Unlike the SemVer 2.0.0 versioning scheme, the YANG SemVer versioning scheme supports updates to older versions of YANG artifacts, to allow for bug fixes and enhancements to artifact versions that are not the latest versions. YANG artifacts that follow the SemVer 2.0.0 versioning scheme are fully compatible with implementations that understand the YANG semantic versioning scheme.

Every YANG module versioned using the YANG SemVer versioning scheme specifies the module's semantic version number as the argument to the "rev:revision-label" statement (referred to herein as "revision label"). If a first YANG module version (e.g., YANG module version 2.0.0) is backported (e.g., taking portions from a newer version of a YANG module and porting that newer version to an older version of the same YANG module) to 1.2.2_non_compatible, the revision label of the new revision may be identified as 1.2.3_non_compatible with its branch history maintained or may be identified as 2.0.0 with its branch history changed for the files to be identical as per the YANG semantic versioning scheme. If 1.2.3_non_compatible is chosen because of tooling or to maintain branch history, a client device is unable to determine whether the versions 1.2.3_non_compatible and 2.0.0 have the same schema. Further, a user (e.g., human operator) of the client device is also unable to visualize and understand the relationship between two separate YANG module versions. A schema comparison tool is needed to determine whether versions 1.2.3_non_compatible and 2.0.0 are aliases. In the absence of the present systems and methods, operating systems such as the Internetworking Operating System (IOS) XE and IOS XR developed and distributed by Cisco Systems, Inc. may select version 1.2.3_non_compatible in their development processes.

Further, in the absence of the present systems and methods, the "non_compatible" (e.g., NBC) tag applied to a revision label may be "sticky" such that if a backwards compatible (BC) change is made to 1.2.2_non_compatible, the revision label will be 1.2.3_non_compatible. The revision label 1.2.3_non_compatible may not be used because this revision label would be viewed as compatible with 1.2.0, for example. By comparing revision labels 1.2.2_non_compatible and 1.2.3_non_compatible, the network device and/or the human cannot know if 1.2.2_non_compatible and 1.2.3_non_compatible are compatible. However, any NBC changes extension in the YANG module would indicate whether 1.2.3_non_compatible is NBC with 1.2.2_non_compatible or not. It is noted that this method works only when the two versions are located within the same branch of a YANG module version tree. In an example where a network device is migrating from 1.2.2_non_compatible to 2.0.0 such as when upgrading from IOS-XE 17.3.1 to 17.5.1 or from IOS-XR 7.2.2 to 7.4.3, the network device is not aware of the impact of that change may have on the network device. The NBC changes are not useful in this situation because the two different YANG module versions are from different branches and do not have the same lineage. This means that a network device and/or the human looking at two version numbers from different branches, where one of them has the "_non_compatible" tag or tag suffix, cannot know from the version numbers only whether the two versions are compatible. A schema comparison tool is needed to determine whether versions 1.2.3_non_compatible and 2.0.0 are backwards compatible.

The present disclosure describes methods, systems, and non-transitory computer-readable medium that address the main shortcomings of YANG semantic versioning as described above and indicated by open standards organizations such as the IETF. The present methods, systems, and non-transitory computer-readable medium allow a network device and/or a human to identify BC relationships and/or identical, alias schema between different revisions which would otherwise require a schema comparison.

Examples described herein provide a method including, with a server computer, comparing a first version of a YANG module stored in a YANG library of the server computer with a second version of the YANG module. The first version may be included in a branch of a parent version that is an earlier revision relative to the second version. The method further includes determining whether the first version is an alias with respect to the second version, the alias being defined as an equivalent version of the YANG module. The method further includes based at least in part on a determination that the first version is the alias with respect to the second version, inserting a version alias extension into a revision label of the second version. The version alias extension includes a plurality of version alias extensions inserted into the revision label.

The method may further include storing the revision label including the version alias extension in the YANG library in association with at least one of the first version or the second version. The method may further include defining a YANG module version tree. The YANG module version tree may include an indication of the version alias extension of the revision label. Further, the method may include transmitting the revision label including the version alias extension to at least one network device communicatively coupled to the server computer.

The method may further include determining whether the second version is released before the first version. Based at least in part on a determination that the second version is released before the first version, the YANG library may be augmented to include a leaf list including the version alias extension.

The method may further include determining whether the second version is backwards compatible with respect to the first version. Based at least in part on a determination that the second version is backwards compatible with respect to the first version, the method may include inserting a version backwards compatible extension into the revision label of the second version. Further, based at least in part on a determination that the second version is not backwards compatible with respect to the first version, the method may include inserting a version non-backwards compatible extension into the revision label of the second version. The version backwards compatible extension and the version non-backwards compatible extension may include a plurality of version backwards compatible extensions and a plurality of version non-backwards compatible extensions inserted into the revision label.

The method may further include storing the revision label including the version backwards compatible extension and the version non-backwards compatible extension in the YANG library in association with at least one of the first version or the second version. A YANG module version tree may be defined. The YANG module version tree may include an indication of the version backwards compatible extension and the version non-backwards compatible extension of the revision label.

The method may further include transmitting the revision label including the version backwards compatible extension and the version non-backwards compatible extension to at least one network device communicatively coupled to the server computer. Further, the method may include determining whether the second version is released before the first version. Based at least in part on a determination that the second version is released before the first version, the method may include augmenting the YANG library including a leaf list including the version backwards compatible extension and the version non-backwards compatible extension.

Examples described herein also provide a non-transitory computer-readable medium storing instructions that, when executed, causes a processor to perform operations, including comparing a first version of a YANG module stored in a YANG library of a server computer with a second version of the YANG module, the first version being included in a branch of a parent version that is an earlier revision relative to the second version. The operations may also include determining whether the second version is backwards compatible with respect to the first version. Based at least in part on a determination that the second version is backwards compatible with respect to the first version, the operations may include inserting a version backwards compatible extension into a revision label of the second version. Further, based at least in part on a determination that the second version is not backwards compatible with respect to the first version, the operations may inserting a version non-backwards compatible extension into the revision label of the second version.

The operations further include storing the revision label including the version backwards compatible extension in the YANG library in association with at least one of the first version or the second version, and defining a YANG module version tree. The YANG module version tree comprising an indication of the version backwards compatible extension of the revision label. The revision label including the version backwards compatible extension may be transmitted to at least one network device communicatively coupled to the server computer. The operations further include determining whether the first version is an alias with respect to the second version, the alias being defined as an equivalent version of the YANG module. Based at least in part on a determination that the first version is the alias with respect to the second version, the operations further include inserting a version alias extension into the revision label of the second version.

Further, the methods described herein may be performed via execution of the instructions stored in the non-transitory computer-readable medium.

Examples described herein also provide a server including one or more processors, and one or more non-transitory computer-readable media storing instructions that, when executed by the one or more processors, cause the one or more processors to perform operations including comparing a first version of a YANG module stored in a YANG library of a server computer with a second version of the YANG module. The first version may be included in a branch of a parent version that is an earlier revision relative to the second version. The operations may further include determining whether the first version is an alias with respect to the second version, the alias being defined as an equivalent version of the YANG module. Based at least in part on a determination that the first version is the alias with respect to the second version, the operations may include inserting a version alias extension into a revision label of the second version. Further, the operations may include determining whether the second version is backwards compatible with respect to the first version. The operations may further include, based at least in part on a determination that the second version is backwards compatible with respect to the first version, inserting a version backwards compatible extension into the revision label of the second version. Further, the operations may include, based at least in part on a determination that the second version is not backwards compatible with respect to the first version, inserting a version non-backwards compatible extension into the revision label of the second version.

The operations further include defining a YANG module version tree. The YANG module version tree may include an indication of the version alias extension of the revision label and an indication of the version backwards compatible extension of the revision label. The operations may further include transmitting the YANG module version tree to a network device communicatively coupled to the server.

The operations further include determining whether the second version is released before the first version, and, based at least in part on a determination that the second version is released before the first version, augmenting the YANG library including a leaf list including the version alias extension. The operations further include determining whether the second version is released before the first version, and, based at least in part on a determination that the second version is released before the first version, augmenting the YANG library including a leaf list including the version backwards compatible extension.

The server may include a network management server configured to manage a network device based at least in part on the revision label. Further, the methods described herein may be performed via execution of the instructions stored in the non-transitory computer-readable medium of the server.

Additionally, the techniques described in this disclosure may be performed as a method and/or by a system having non-transitory computer-readable media storing computer-executable instructions that, when executed by one or more processors, performs the techniques described above.

EXAMPLE EMBODIMENTS

Turning now to the figures, FIG. 1 illustrates a system-architecture diagram of a network management system 100 that utilizes a network management server 106, according to an example of the principles described herein. The network management system 100 may include a number of network devices 102-1, 102-2, . . . , 102-N, where N is any integer greater than or equal to 1 (collectively referred to herein as network device(s) 102 unless specifically addressed otherwise). The network devices 102 may be communicatively coupled to a number of server(s) 104 via a network 108. The network management system 100 may include any intermediate devices between the network devices 102 and the server(s) 104 such as, for example, routers, switches, other server computing devices, etc. The network devices 102 may include any computing device seeking to access resources and/or services provided in another network such as the Internet while being able to identify alias and/or backwards compatible modules (e.g., YANG modules) as described herein. In one example, the network devices 102 may include a controller device, a host device, a workstation, a desktop computer, a laptop, a tablet, a network appliance, an e-reader, a smartphone, a server, a switch, a router, a hub, a bridge, a gateway, a modem, a repeater, an access point, a virtual machine, or other computing devices and virtual (e.g., emulated) machines requesting services from the service providers 110.

The server(s) 104 may be any combination of computer hardware and/or software that provides functionality for other programs or devices, such as the network devices 102 acting as client devices. For example, the server(s) 104 may provide various functionalities or services, such as sharing data or resources among multiple network devices 102 or performing computation for a network device 102. Any number of the network devices 102 may utilize a single one of the servers 104, and any one of the network devices 102 may utilize a plurality of the servers 104. Some examples of a server 104 may include database servers, file servers, mail servers, print servers, web servers, game servers, and application servers, among other types of servers.

One type of server 104 among the server(s) 104 may include a network management server (NMS) 106. The NMS 106 may include any server computing device configured to manage the network devices 102, other servers 104, a YANG library, and any revision labels including version alias extensions and/or version backwards compatible extensions as described herein. In one example, the present systems and methods may include YANG modules stored as part of a YANG library (e.g., YANG library data 212, FIGS. 2 and 312, FIG. 3) and stored directly in memory or a file system of any computing device described herein. In one example, the NMS 106 may manage the YANG library, and any revision labels including version alias extensions and/or version backwards compatible extensions for the other servers 104 as well. In the examples described herein, the YANG library and any YANG library data may serve as a repository for any YANG modules and any augmentations to and/or extensions added to the YANG modules within the YANG library. Further, in one example, the network management server 106 may be included in a cloud computing-based network infrastructure. In this example, the cloud computing-based network infrastructure may include additional resource and/or services associated with cloud computing. Further, the cloud computing-based network infrastructure of the NMS 106 in this example may provide on-demand availability of computer system resources (e.g., infrastructure as a service (IaaS), hardware as a service (HaaS), Internet of Things as a Service (IoTaaS), load balancing as a service (LBaaS), network as a service (NaaS), function as a service (FaaS), software as a service (SaaS), anything as a service (XaaS), among others) including data storage (cloud storage) and computing power, with or without direct active management by the user.

The network 108 may include any combination of computer hardware and/or software that assists in the communication between, for example, the network devices 102 and the servers 104, among any intermediary devices, via one or more wired or wireless links. Examples of area networks include, for example, local area networks (LANs), neighborhood area networks (NANs), personal area networks (PANs), home area networks (HANs), field area networks (FANs), or the like. While only one network 108 is depicted in FIG. 1, in practice, multiple networks may exist and may collectively define a larger network. At any given time, each individual network device 102 and/or server 104 may be a member of a particular network 108.

The network devices 102 may transmit and/or receive one or more communications/transmissions (e.g., Protocol Data Units (PDUs), such as bits, frames, packets, segments, etc.) with any device included within the network 108 such as other network devices 102, the servers 104, and any intermediary devices. In this manner, the data transmitted by the network devices 102 and/or the servers 104 may be transmitted directly or indirectly to other network devices 102 and/or servers 104.

Figure 2:
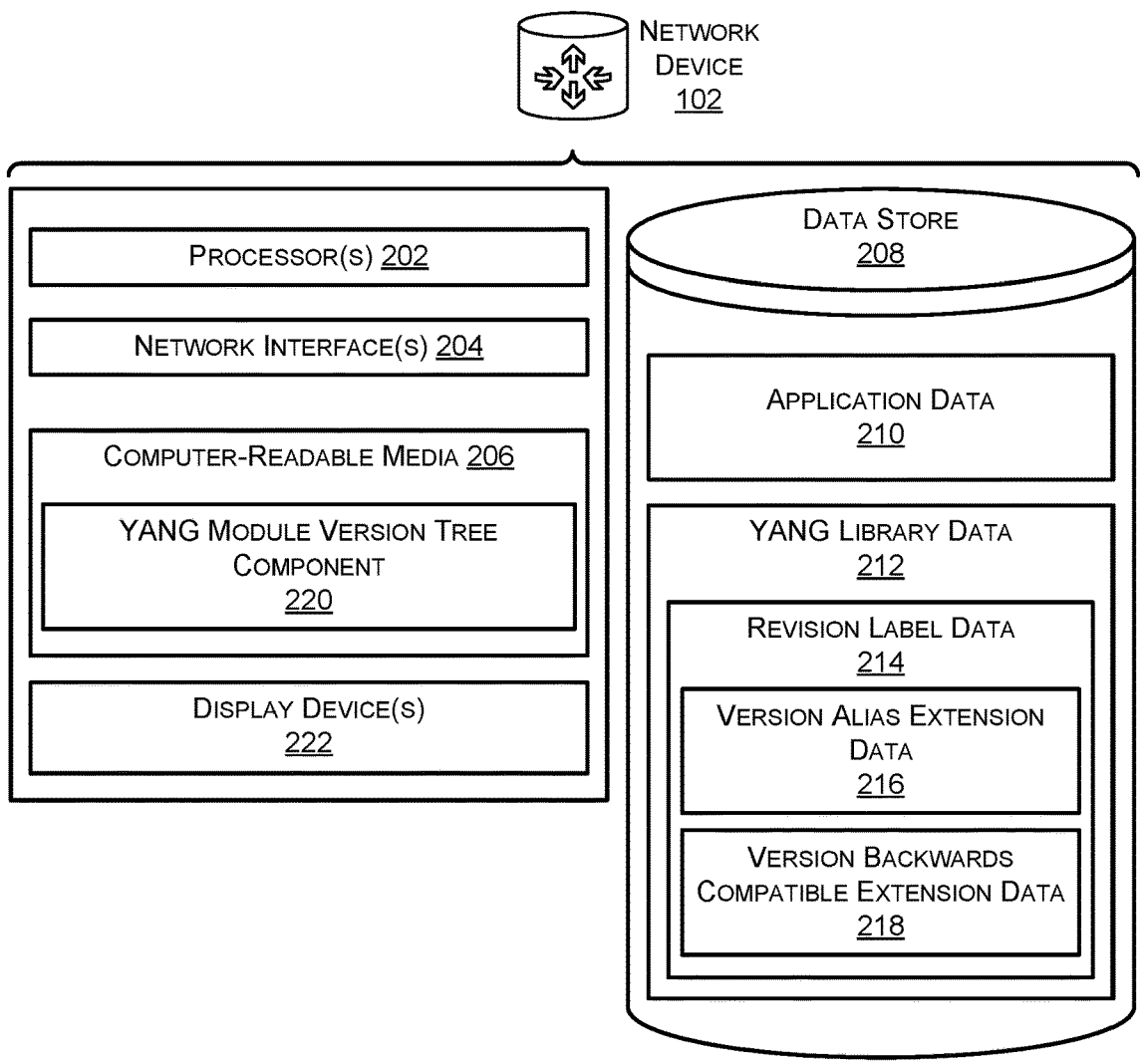
FIG. 2 illustrates a component diagram of example components of a network device, according to an example of the principles described herein.

The network device 102 and the servers 104 will now be described in connection with FIGS. 2 and 3, respectively. FIG. 2 is a component diagram 200 of example components of a network device 102, according to an example of the principles described herein. As illustrated, the network device 102 may include one or more hardware processor(s) 202 configured to execute one or more stored instructions. The processor(s) 202 may comprise one or more cores. Further, the network device 102 may include one or more network interfaces 204 configured to provide communications between the network device 102 and other devices, such as devices associated with the system architecture of FIG. 1 including other network device 102, the network 108, the servers 104, the network management server(s) 106, and/or other systems or devices associated with the network device 102 and/or remote from the network device 102. The network interfaces 204 may include devices configured to couple to personal area networks (PANs), wired and wireless local area networks (LANs), wired and wireless wide area networks (WANs), and so forth. For example, the network interfaces 204 may include devices compatible with the network devices 102, the network 108, the servers 104, the network management server(s) 106, and/or other systems or devices associated with the network device 102.

The network device 102 may also include computer-readable media 206 that stores various executable components (e.g., software-based components, firmware-based components, etc.). In one example, the computer-readable media 206 may include, for example, working memory, random access memory (RAM), read only memory (ROM), and other forms of persistent, non-persistent, volatile, non-volatile, and other types of data storage. In addition to various components discussed herein, the computer-readable media 206 may further store components to implement functionality described herein. While not illustrated, the computer-readable media 206 may store one or more operating systems utilized to control the operation of the one or more devices that comprise the network device 102. According to one example, the operating system comprises the LINUX operating system. According to another example, the operating system(s) comprise the WINDOWS SERVER operating system from MICROSOFT Corporation of Redmond, Wash. According to further examples, the operating system(s) may comprise the UNIX operating system or one of its variants. It may be appreciated that other operating systems may also be utilized.

Additionally, the network device 102 may include a data store 208 which may comprise one, or multiple, repositories or other storage locations for persistently storing and managing collections of data such as databases, simple files, binary, and/or any other data. The data store 208 may include one or more storage locations that may be managed by one or more database management systems. The data store 208 may store, for example, application data 210 defining computer-executable code utilized by the processor 202 to execute the computer-readable media 206. Further, the application data 210 may include data relating to user preferences associated with the computer-readable media 206, passwords, usernames, key/value data, and other data that may be used by the computer-readable media 206 to sign on to the services described herein.

Further, the data store 208 may store YANG library data 212. The YANG library data 212 may include any data including YANG packages and associated YANG package definitions, and other data that may assist in the analysis of the data module (e.g., YANG data module) versions for aliases and backwards compatibility as described herein. As used in the present specification and in the appended claims, the term "extension" is meant to be understood broadly any annotation to any YANG module or YANG package stored in any data store or YANG library as YANG library data 212 and FIG. 3, 312. The extensions may include, for example, definitions, annotations, YANG package definitions, tags, tag suffixes, revision labels, and other amendments to the extensions to a YANG module that assist in defining backwards compatibility, non-backwards compatibility, and alias relationships with respect to other YANG modules.

The YANG library data 212 may include a number of revision label data 214. A revision label may be used in the name of a file containing a YANG module or submodule. Each revision entry in a module or submodule may have a revision label associated with it, providing an alternative alias to identify a particular revision of a module or submodule. In one example, the revision label may be used to provide an additional versioning identifier associated with the revision. YANG SemVer versioning scheme, for example, defines a versioning scheme based on SemVer 2.0.0 that maybe used as a revision label. Submodules may use a revision label scheme. When the submodules use a revision label scheme, the submodules may use a revision label scheme that is different from the one used in the including module.

The revision label space of submodules is separate from the revision label space of the including module. A change in one submodule results in a new revision label of that submodule and the including module, but the actual values of the revision labels in the module and submodule may be completely different. A change in one submodule does not result in a new revision label in another submodule. A change in a module revision label does not necessarily mean a change to the revision label in all included submodules.

Further, if a revision has an associated revision label, then it may be used instead of the revision date in an "rev: revision-or-derived" extension statement argument.

A specific revision-label identifies a specific revision (e.g., variant) of the module. If two YANG modules contain the same module name and the same revision label (and hence also the same revision-date) in their latest revision statement, then the contents of the two modules, including the revision history, must be identical. If a revision has an associated revision label, then the revision label may be used instead of the revision date in the filename of a YANG file, where it takes the form:

module-or-submodule-name [['@' revision-date]|['#' revision-label]]
('.yang'/'.yin')

such as:
E.g., acme-router-module@2018-01-25.yang
E.g., acme-router-module#2.0.3.yang YANG module or submodule files may be identified using either a revision date or a revision label. In one email, a single file name may exist for the same module or submodule revision. Two file names, one with the revision date and another with the revision label, may exist for the same module or submodule revision, such as, for example, when migrating from one scheme to the other.

Revision labels may be used as an overlay or alias to provide additional context or an additional way to refer to a specific revision. A revision label scheme may use modified YANG [semver] rules for YANG artifacts such as, for example, YANG modules and YANG packages ([I-Dietf-netmod-yang-packages]) as well as the revision label definition for using this scheme. The purpose of creating revision labels and revision label schemes is to add a human readable version label that provides compatibility information for the YANG artifact without the individual needing to compare or parse its body. The revision label and rules represent a recommended revision label scheme for IETF YANG artifacts.

The revision label data 214 of the YANG library data 212 may include version alias extension data 216 and version backwards compatible (BC) extension data 218. The version alias extension data 216 may define any number of extensions used to indicate which versions of a YANG module are equivalent. For example, with a version tree discussed previously, the module revision with label 1.2.3_non_compatible may have the version-alias sub-statement (e.g., a version alias extension for the revision label) as follows.

revision 2017-10-30 {
description " . . . ";
rev:revision-label "1.2.3_non_compatible" {
  version-alias "2.0.0";
}
}

As included in the above revision label, "version-alias '2.0.0'" appended to the revision label indicates that a version alias to version 1.2.3_non_compatible is version 2.0.0. In this manner, the extension "version-alias '2.0.0'" serves as a tool to indicate an alias of version 1.2.3_non_compatible. In one example, multiple version-alias sub-statements may be included for a revision-label.

In an example where version 2.0.0 is published before the release of version 1.2.3_non_compatible, this creates a situation where version 2.0.0 will not have a version alias in version 1.2.3_non_compatible. In this situation, the YANG library data 212 may be augmented with an optional list or "leaf list" including the version alias extension. The YANG module augments the module list in YANG library with a revision label leaf to optionally declare the revision label associated with the particular revision of each module. Specifically, an IETF YANG library revisions YANG module may augment the YANG library data 212 with two leaves to allow a server such as the NMS 106 to report how it handles status "deprecated" and status "obsolete" nodes. The leaves include "deprecated-nodes-implemented" indications which, if set to "true," indicates that all schema nodes with a status "deprecated" child statement are implemented equivalently as if they had status "current," or otherwise deviations are to be used to explicitly remove "deprecated" nodes from the schema. If this leaf is set to "false" or absent, then the behavior is unspecified. The leaves also include "obsolete-nodes-absent" indications which, if set to "true," indicates that the server such as the NMS server 106 does not implement any status "obsolete" nodes. On the other hand, if this leaf is set to "false" or absent, then the behavior is unspecified.

A server such as the NMS 106 may set both the "deprecated-nodes-implemented" and "obsolete-nodes-absent" leaves to "true." If a server does not set the "deprecated-nodes-implemented" leaf to "true," then the network devices 102 may not rely solely on the "rev:nbc-changes" statements to determine whether two module revisions are backwards-compatible, and may also consider whether the status of any nodes has changed to "deprecated" and whether those nodes are implemented by the server.

Based on the above, with a version tree discussed previously, a leaf list including the version alias extension may be expressed within the YANG library in situations where a the second version of the YANG module is released before the first version of the YANG module (e.g., a second version of the YANG module having a relatively higher version number is released before the first version of the YANG module having a relatively lower version number). Therefore, the revision label may include an optional list of leaf list of the version alias extension as follows:
    module: ietf-yang-library-revisions
    augment/yanglib:yang-library/yanglib:module-set/yanglib:module:
    +--ro revision-label? rev:revision-label
    +--ro version-alias* rev:revision-label In one example, the version alias expression may also be identified within a YANG package definition. In this example, because there may be a scenario where use of the alias annotation is desirable, inclusion of data defining the alias may be provided as a YANG package definition.

The revision label data 214 of the YANG library data 212 may also include version backwards compatible (BC) extension data 218. The version BC extension data 218 may define any number of extensions used to indicate which versions of a YANG module are non-backwards-compatible (NBC) or backwards-compatible (BC) with other versions of the YANG module. In one example, a YANG extension "version-bc" may be used to indicate which revision labels this version is compatible with excluding the revisions that can easily be deduced from the revision labels. For example, the module version with label 1.2.3_non_compatible may have the version-bc sub-statement (e.g., a version backward compatible extension for the revision label) as follows.
    revision 2017-10-30 {
    description " . . . ";
    rev:revision-label "1.2.3_non_compatible" {
        version-bc "1.2.2_non_compatible";
    }
    }
Similarly, the module revision with label 2.0.0 may include the version-bc sub-statement as follows.
    revision 2018-04-30 {
    description " . . . ";
    rev:revision-label "2.0.0" {
        version-bc "1.2.2_non_compatible";
        version-bc "1.2.3_non_compatible";
    }
    }

As included in the first of the above revision labels, "version-bc '1.2.2_non_compatible'" appended to the revision label indicates that module versions 1.2.3_non_compatible is backwards compatible with respect to module version 1.2.2_non_compatible. Further, as included in the second of the above revision labels, "version-bc '1.2.2_non_compatible'" and "version-bc '1.2.3_non_compatible'" appended to the revision label indicates that module version 2.0.0 is backwards compatible with respect to module versions 1.2.2_non_compatible and 1.2.3_non_compatible. In this manner, the extensions "version-bc '1.2.2_non_compatible'," and "version-bc '1.2.3_non_compatible'" in the revision labels serve as a tool to indicate backwards compatibility of versions 1.2.3_non_compatible and 2.0.0, respectively. In one example, multiple version-bc sub-statements may be included for a revision-label.

Based on the above, with a version tree discussed previously, a leaf list including the version backward compatible extension may be expressed within the YANG library in situations where a the second version of the YANG module is released before the first version of the YANG module (e.g., a second version of the YANG module having a relatively higher version number is released before the first version of the YANG module having a relatively lower version number). Therefore, the revision label may include an optional list of leaf list of the version backward compatible extension as follows:
    module: ietf-yang-library-revisions
    augment/yanglib:yang-library/yanglib:module-set/yanglib:module:
    +--ro revision-label? rev:revision-label
    +--ro version-bc* rev:revision-label Having described the YANG library data 212 including the version alias extension data 216 and the version backwards compatible data 218 of the revision label data 214, the computer-readable media 206 of the network device 102 may include a YANG module version tree component 220.

The YANG module version tree component 220 may be supported by the application data 210 and executed by the processor(s) 202. Once executed by the processor(s) 202, the YANG module version tree component 220 may cause a version tree such as the version tree depicted in FIG. 4 to be displayed on a display device 222 of the network device 102. The network device 102 may include a number of display device(s) 222 used to present information to a user such as the version tree of FIG. 4. The display device(s) 222 may include any output device such as, for example, as a computer monitor, a flat-panel display, a digital projector, a printer, or other type of output device that may display the version tree.

With the version tree displayed on the display device 222, a user of the network device 102 may be able to readily identify the various versions and revisions to the YANG module, a revision history of the YANG module, branched revision history of the YANG module, the different branches versions and revisions to the YANG module within each branch, the versions and revisions of the YANG module that are aliases within one another, and the versions and revisions of the YANG module that are non-backwards compatible or backwards compatible with one another, among other relationships between the version or revisions of the YANG module. In this manner, a user may be able to readily identify which of a number of versions or revisions of the YANG module may be utilized by their network device 102 without breaking the network device 102. Modifying a system such as the network device 102 in a way that does not allow backward compatibility is sometimes called "breaking" backward compatibility, and includes a change in one part of a software system that causes other components to fail which may occur in shared libraries of code used by multiple applications or computing devices. Thus, the YANG library may be maintained according to the methods described herein in order to avoid the breaking of one or more network devices 102 within the network management system 100. The NMS 106 serves to maintain its own YANG library and the YANG libraries of the network devices 102 in order to avoid any breaking issues.

Figure 3:
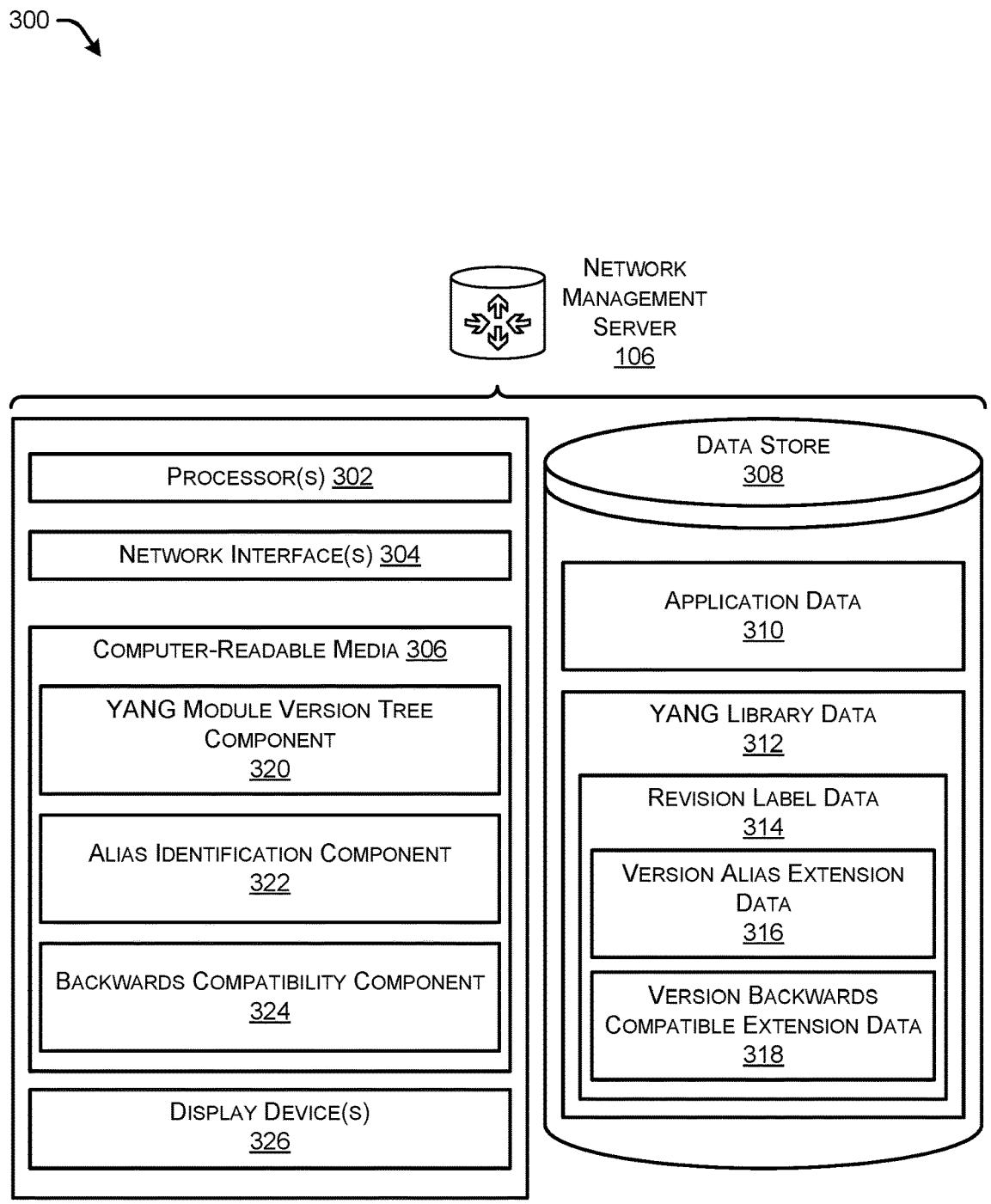
FIG. 3 illustrates a component diagram of example components of a network management server, according to an example of the principles described herein.

FIG. 3 illustrates a component diagram 300 of example components of a network management server (NMS) 106, according to an example of the principles described herein. As illustrated, the NMS 106 may include one or more hardware processor(s) 302 configured to execute one or more stored instructions. The processor(s) 302 may comprise one or more cores. Further, the NMS 106 may include one or more network interfaces 304 configured to provide communications between the NMS 106 and other devices, such as devices associated with the system architecture of FIG. 1 including the network devices 102, the network 108, the servers 104, and/or other systems or devices associated with the NMS 106 and/or remote from the NMS 106. The network interfaces 304 may include devices configured to couple to personal area networks (PANs), wired and wireless local area networks (LANs), wired and wireless wide area networks (WANs), and so forth. For example, the network interfaces 304 may include devices compatible with the network devices 102, the network 108, the servers 104, the network management server(s) 106, and/or other systems or devices associated with the NMS 106.

The NMS 106 may also include computer-readable media 306 that stores various executable components (e.g., software-based components, firmware-based components, etc.). In one example, the computer-readable media 306 may include, for example, working memory, random access memory (RAM), read only memory (ROM), and other forms of persistent, non-persistent, volatile, non-volatile, and other types of data storage. In addition to various components discussed herein, the computer-readable media 306 may further store components to implement functionality described herein. While not illustrated, the computer-readable media 306 may store one or more operating systems utilized to control the operation of the one or more devices that comprise the NMS 106. According to one example, the operating system comprises the LINUX operating system. According to another example, the operating system(s) comprise the WINDOWS SERVER operating system from MICROSOFT Corporation of Redmond, Wash. According to further examples, the operating system(s) may comprise the UNIX operating system or one of its variants. It may be appreciated that other operating systems may also be utilized.

Additionally, the NMS 106 may include a data store 308 which may comprise one, or multiple, repositories or other storage locations for persistently storing and managing collections of data such as databases, simple files, binary, and/or any other data. The data store 308 may include one or more storage locations that may be managed by one or more database management systems. The data store 308 may store, for example, application data 310 defining computer-executable code utilized by the processor 302 to execute the computer-readable media 306. Further, the application data 310 may include data relating to user preferences associated with the computer-readable media 306, passwords, user-names, key/value data, and other data that may be used by the computer-readable media 306 to sign on to the services described herein.

Further, the data store 308 may store YANG library data 312. The YANG library data 312 may include any data, and other data described herein that may assist in the analysis of the data module (e.g., YANG data module) versions for aliases and backwards compatibility as described herein.

The YANG library data 312 may include a number of revision label data 314. As described above in connection with FIG. 2, a revision label may be used in the name of a file containing a YANG module or submodule. Each revision entry in a module or submodule may have a revision label associated with it, providing an alternative alias to identify a particular revision of a module or submodule. In one example, the revision label may be used to provide an additional versioning identifier associated with the revision as described above. The revision label data 314 of the YANG library data 312 may include version alias extension data 316 and version backwards compatible (BC) extension data 318 as described above in connection with the revision label data 214 of the YANG library data 212 of the network device 102. In one example, the YANG library data 312 of the NMS 106 may serve as a master for all other YANG library data 212 of the network devices 102. In this example, the NMS 106 may periodically distribute the YANG library data 312 to the network devices 102 in order to update the respective YANG library data 212 of the network devices 102. In this manner, all computing devices within the network management system 100 may include as up-to-date YANG library data 312. In one example, periodically distribute the YANG library data 312 to the network devices 102 may include, with the NMS 106, distributing and updating the YANG library data 212 of the network devices 102 when any changes to the YANG library data 312 of the NMS 106 are made or detected.

Having described the YANG library data 312 including the version alias extension data 316 and the version backwards compatible data 318 of the revision label data 314, the computer-readable media 306 of the NMS 106 may include a YANG module version tree component 320, an alias identification component 322, and a backwards compatibility component 324.

The YANG module version tree component 320 may be supported by the application data 310 and executed by the processor(s) 302. Once executed by the processor(s) 302, the YANG module version tree component 320 may cause a version tree such as the version tree depicted in FIG. 4 to be displayed on a display device 326 of the NMS 106 as described above in connection with the YANG module version tree component 220 of the network device 102. The NMS 106 may include a number of display device(s) 322 used to present information to a user such as the version tree of FIG. 4. The display device(s) 322 may include any output device such as, for example, as a computer monitor, a flat-panel display, a digital projector, a printer, or other type of output device that may display the version tree.

The YANG module version tree may include an indication of a version alias extension, a version backwards compatible extension and/or a version non-backwards compatible extension of the revision label. The YANG module version tree component 220 may cause the version alias extension, the version backwards compatible extension and/or the version non-backwards compatible extension of the revision label to be displayed in the YANG module version tree.

The alias identification component 322 may be supported by the application data 310 and executed by the processor(s)

302. Once executed by the processor(s) 302, the alias identification component 322 may compare a first version of a YANG module stored in a YANG library (e.g., as YANG library data 312) of the NMS 106 with a second version of the YANG module. The first version of the YANG module may be included in a branch of a parent version that is an earlier revision relative to the second version. The alias identification component 322 may also include determining whether the first version is an alias with respect to the second version. As mentioned above, the alias may be defined as an equivalent version of the YANG module. Based at least in part on a determination that the first version is an alias with respect to the second version, the alias identification component 322 may inserting a version alias extension into a revision label of the second version or otherwise amend the revision label to include the version alias extension. In one example, the version alias extension may be included within the revision label as described above in connection with the revision labels described above in connection with FIG. 2.

Once the alias identification component 322 compares versions of the YANG module, determined whether they are aliases, and inserted a version alias extension into the YANG module, the alias identification component 322 may cause the revision label including the version alias extension in the YANG library in association with at least one of the first version or the second version of the YANG module. In one example, the revision label may be stored in the data store 308 as YANG library data 312, revision label data 314 and/or version alias extension data 316. As mentioned above, the revision label including the version alias extension may be transmitted by the NMS 106 to at least one network device 102 communicatively coupled to the NMS 106.

Further, the alias identification component 322 may, when executed by the processor(s) 302, determine whether the second version of the YANG module is released before the first version of the YANG module (e.g., a second version of the YANG module having a relatively higher version number is released before the first version of the YANG module having a relatively lower version number). Based at least in part on a determination that the second version is released before the first version, the alias identification component 322 may cause the YANG library (e.g., the YANG library data 312) to be augmented including a leaf list including the version alias extension as described above in connection with FIG. 2.

The backwards compatibility component 324 may be supported by the application data 310 and executed by the processor(s) 302. Once executed by the processor(s) 302, the backwards compatibility component 324 may compare a first version of the YANG module stored in the YANG library (e.g., as the YANG library data 312) of the NMS 106 with a second version of the YANG module. Again, the first version being included in a branch of a parent version that is an earlier revision relative to the second version. The backwards compatibility component 324 may determine whether the second version is backwards compatible with respect to the first version. Based at least in part on a determination that the second version is backwards compatible with respect to the first version, the backwards compatibility component 324 may insert a version backwards compatible extension into the revision label of the second version. Further, based at least in part on a determination that the second version is not backwards compatible with respect to the first version, the backwards compatibility component 324 may insert a version non-backwards compatible extension into the revision label of the second version.

In one example, the network device 102 and/or the server(s) 106 including the network management server(s) 106 may be utilizing a first version of the YANG module. The software versions executed by the server, for example, may be updated such that it utilizes a second version of the YANG module. In a situation where the second version is backwards compatible with the first version, then the network device 102 designed to function utilizing the first version will interoperate or otherwise function with the server(s) 106 including the network management server(s) 106 running the second version. Thus, the second version is backwards compatible with regard to the first version, meaning that an upgrade from the first version to the second version by the network device 102 would be appropriate and would not result in breaking the network device 102. Further, an upgrade from one module to a non backwards-compatible module would also not break the network device. The breakage occurs between the network management server(s) 106 and the network device 102. That is, if the two revisions of the module are not backwards-compatible, the contract between the network device 102 and the network management server(s) 106 is broken, and the network management server(s) 106 may no longer be able to properly manage the network device 102.

The execution of the backwards compatibility component 324 may further include storing the revision label (e.g., as revision label data 314) including the version backwards compatible extension (e.g., as version backwards compatible data 318) and the version non-backwards compatible extension (e.g., as version backwards compatible data 318) in the YANG library (e.g., a YANG library data 312) in association with at least one of the first version or the second version. Further, in a similar manner as described above, the revision label including the version backwards compatible extension and/or the version non-backwards compatible extension may be transmitted to at least one network device 102 communicatively coupled to the NMS 106 through execution of the backwards compatibility component 324.

Execution of the backwards compatibility component 324 may further include determining whether the second version of the YANG module is released before the first version of the YANG module a the second version of the YANG module is released before the first version of the YANG module (e.g., a second version of the YANG module having a relatively higher version number is released before the first version of the YANG module having a relatively lower version number). Based at least in part on a determination that the second version is released before the first version, the backwards compatibility component 324 may augment the YANG library (e.g., the YANG library data 312) including a leaf list including the version backwards compatible extension and/or the version non-backwards compatible extension.

Figure 4:
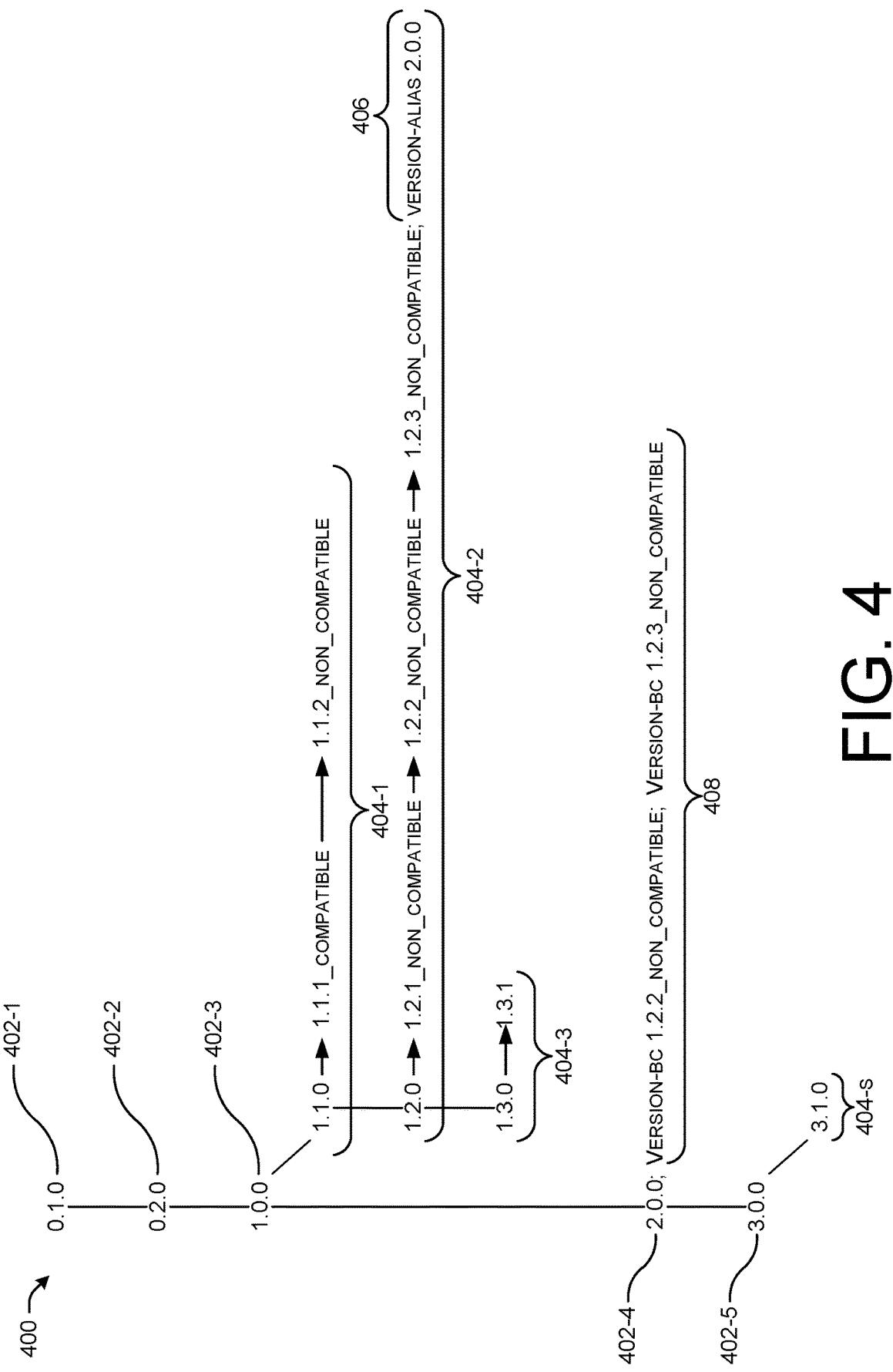
FIG. 4 illustrates a diagram of a version tree, according to an example of the principles described herein.

FIG. 4 illustrates a diagram of a version tree 400, according to an example of the principles described herein. The version tree 400 may be created via the execution of the YANG module version tree component 220 of the network device 102 and/or the YANG module version tree component 320 of the NMS 106. The YANG semantic versioning scheme may be used for YANG artifacts that employ the YANG SemVer versioning scheme label. The YANG semantic versioning scheme is extended from version 2.0.0 of the semantic versioning scheme defined at semver.org (e.g., SemVer 2.0.0) to cover the additional requirements for the management of YANG artifact lifecyles that cannot be addressed using the semver.org 2.0.0 versioning scheme alone. Further, unlike the SemVer 2.0.0 versioning scheme, the YANG semantic versioning scheme (YANG SemVer versioning scheme) supports updates to older versions of YANG artifacts to allow for bug fixes and enhancements to artifact versions that are not the latest. However, the YANG semantic versioning scheme does not provide for the unlimited branching and updating of older revisions.

YANG artifacts that follow the SemVer 2.0.0 versioning scheme are fully compatible with implementations that understand the YANG semantic versioning scheme. If updates are restricted to the latest revision of the artifact only, then the version numbers used by the YANG semantic versioning scheme are exactly the same as those defined by the SemVer 2.0.0 versioning scheme. Every YANG module versioned using the YANG semantic versioning scheme specifies the module's semantic version number as the argument to the "rev:revision-label" statement (e.g., the revision label).

The rules associated with the present systems and methods are designed to work well with existing versions of YANG and allow for artifact authors to migrate to this scheme. Thus, it is not expected that all revisions of a given YANG artifact will have a semantic version label. For example, the first revision of a module may have been produced before the scheme of the present systems and methods was available.

YANG packages that make use of this semantic versioning scheme may have their semantic version as the value of the "revision_label" (e.g., the revision label) property. The YANG SemVer version number may be expressed as a string of the form: "X.Y.Z_COMPAT"; where X, Y, and Z each represent non-negative integers smaller than 2147483647 without leading zeroes, and _COMPAT represents an optional suffix of either "_compatible" or "_non_compatible" referring to the backwards compatibility or non-backwards compatibility of one YANG module with respect to another YANG module. "X" is the "major version." Changes in the major version number indicate changes that are non-backwards-compatible to versions with a lower major version number. "Y" is the "minor version." Changes in the minor version number indicate changes that are backwards-compatible to versions with the same major version number, but are not backwards-compatible to version with a lower minor version number and no patch "_compatible" or "_non_compatible" modifier. "Z_COMPAT" is the patch version and modifier. Changes in the patch version number can indicate editorial, backwards-compatible, or non-backwards-compatible changes relative to versions with the same major and minor version numbers, but are not backwards-compatible to version with a lower patch version number, depending on what form modifier "_COMPAT" takes:

If the modifier string is absent, the change represents an editorial change. An editorial change is defined to be a change in the content of the YANG artifact that does not affect the semantic meaning or functionality provided by the artifact in any way. Some examples include correcting a spelling mistake in the description of a leaf within a YANG module, non-significant whitespace changes (e.g. realigning description statements, or changing indentation), or changes to YANG comments. It may be noted that restructuring how a module uses, or does not use, submodules is treated as an editorial level change on the condition that there is no change in the semantic behavior of the YANG module due to the restructuring. If, however, the modifier string is present, the meaning is described as "_compatible" where the change represents a backwards-compatible change and "_non_compatible" where the change represents a non-backwards-compatible change The YANG artifact name and YANG semantic version number uniquely identify a revision of said artifact. There cannot be multiple instances of a YANG artifact definition with the same name and YANG semantic version number but different content (and in the case of modules, different revision dates). There cannot be multiple versions of a YANG artifact that have the same major, minor, and patch version numbers, but different patch modifier strings. For example, artifact version "1.2.3_non_compatible" cannot be defined if artifact version "1.2.3_non_compatible" has already been defined.

As depicted, the version tree 400 may include a number of root YANG module versions 402-1, 402-2, 402-3, 402-4, . . . , 402-R, where R is any integer greater than or equal to 1 (collectively referred to herein as root YANG module version(s) 402 unless specifically addressed otherwise). The root YANG module versions 402 may include any version or revision that includes a different major version numbers. For example, the root YANG module version(s) 402 are designated in FIG. 4 as 0.1.0, 0.2.0, 1.0.0, 2.0.0, and 3.0.0 with each having different major version numbers (note that 0.1.0 is the first beta module version and 0.2.0 is the second beta module version (with NBC changes)).

Further, the version tree 400 may include a number of branches 404-1, 404-2, 404-3, . . . , 404-s, where s is any integer greater than or equal to 1 (collectively referred to herein as branch(es) 404 unless specifically addressed otherwise). Each of the branches 404 may share the same major version number, but do not share the same minor version number and/or patch version number. For example, version 1.1.0 in the first branch 404-1 has a different minor version number as to 1.2.0 in the second branch 404-2.

Each of the branches 404 may include a number of version modules with different patch version numbers. For example, version numbers 1.1.0, 1.1.1_compatible, and 1.1.2_non_compatible are each included within the same branch 404-1, but each have different patch version numbers. The different branches 404 may have different numbers of version modules.

The version tree 400 of FIG. 4 illustrates how a version history of an example YANG module may evolve. For example, the version tree 400 may represent the following changes, listed in chronological order from oldest revision to newest:

first beta module version
0.2.0—second beta module version (with NBC changes)
1.0.0—first release (may have NBC changes from 0.2.0)
1.1.0—added new functionality, leaf "foo" (BC)
1.2.0—added new functionality, leaf "baz" (BC)
1.3.0—improve existing functionality, added leaf "foo-64" (BC)
1.3.1—improve description wording for "foo-64" (Editorial)
1.1.1_compatible—backport "foo-64" leaf to 1.1.x to avoid implementing "baz" from 1.2.0 (BC)
2.0.0—change existing model for performance reasons, e.g. re-key list (NBC)
1.1.2_non_compatible—NBC point bug fix, not required in 2.0.0 due to model changes (NBC)
3.0.0—NBC bugfix, rename "baz" to "bar"; also add new BC leaf "wibble"; (NBC)
1.2.1_non_compatible—backport NBC fix, changing "baz" to "bar"
1.2.2_non_compatible—backport "wibble". This is a BC change but "non_compatible" modifier is sticky.
3.1.0—introduce new leaf "wobble" (BC)

The partial ordering relationships based on the semantic versioning numbers may be defined as follows:

<1.1.0<1.2.0<1.3.0<2.0.0<3.0.0<3.1.0
1.0.0<1.1.0<1.1.1_compatible<1.1.2_non_compatible
1.0.0<1.1.0<1.2.0<1.2.1_non_compatible<1.2.2_non_compatible There is no ordering relationship between 1.1.1_compatible and either 1.2.0 or 1.2.1_non_compatible, except that they share the common ancestor of 1.1.0. Looking at the version number alone, a user may be able to quickly determine that the module definition in 2.0.0 does not necessarily contain the contents of 1.3.0. However, the module revision history in 2.0.0 may well indicate that it was edited from module version 1.3.0.

In the example of FIG. 4, a version alias 406 is indicated as being appended to version number "1.2.3_non_compatible." This indicates that version number 1.2.3_non_compatible is an alias with respect to version number 2.0.0. Thus, a user may readily identify within the version tree 400 any YANG module versions that are aliases. The revision label described above identifying version 1.2.3_non_compatible as being a version alias of 2.0.0 defines the manner in which the version tree 400 depicted in FIG. 4 displays this relationship. Again, the version alias 406 is used to indicate which YANG module versions are equivalent. Although "version-alias 2.0.0" is depicted in FIG. 4 as being the indicator for the version alias 406 of YANG module version 1.2.3_non_compatible, any type of nomenclature may be used in connection with the identification of the version alias 406 within the version tree 400.

Further, the version tree 400 in the example of FIG. 4 may further identifies a version backwards compatible extension for a YANG module version. For example, the version backwards compatible extension may be identified via a version BC indicator 408. The version BC indicator 408 in the example of FIG. 4 indicates that YANG module version 2.0.0 is backwards compatible with respect to both YANG module versions 1.2.2_non_compatible and 1.2.3_non_compatible. In other words, a user may utilize YANG module version 2.0.0 in place of YANG nodule version 1.2.2_non_compatible or 1.2.3_non_compatible without experiencing issues with regard to execution of the YANG module without breaking. YANG module version 2.0.0 is backwards compatible with YANG module versions 1.2.2_non_compatible and 1.2.3_non_compatible. In the example of FIG. 4, a similar version BC indicator 408 may be identified within the version tree 400 that indicates YANG module version 2.0.0 is backwards compatible with YANG module version 1.2.2_non_compatible and YANG module version 1.2.3_non_compatible as indicated in the example described above in connection with the version backward compatible extensions for the revision label of FIGS. 2 and 3.

Figure 5:
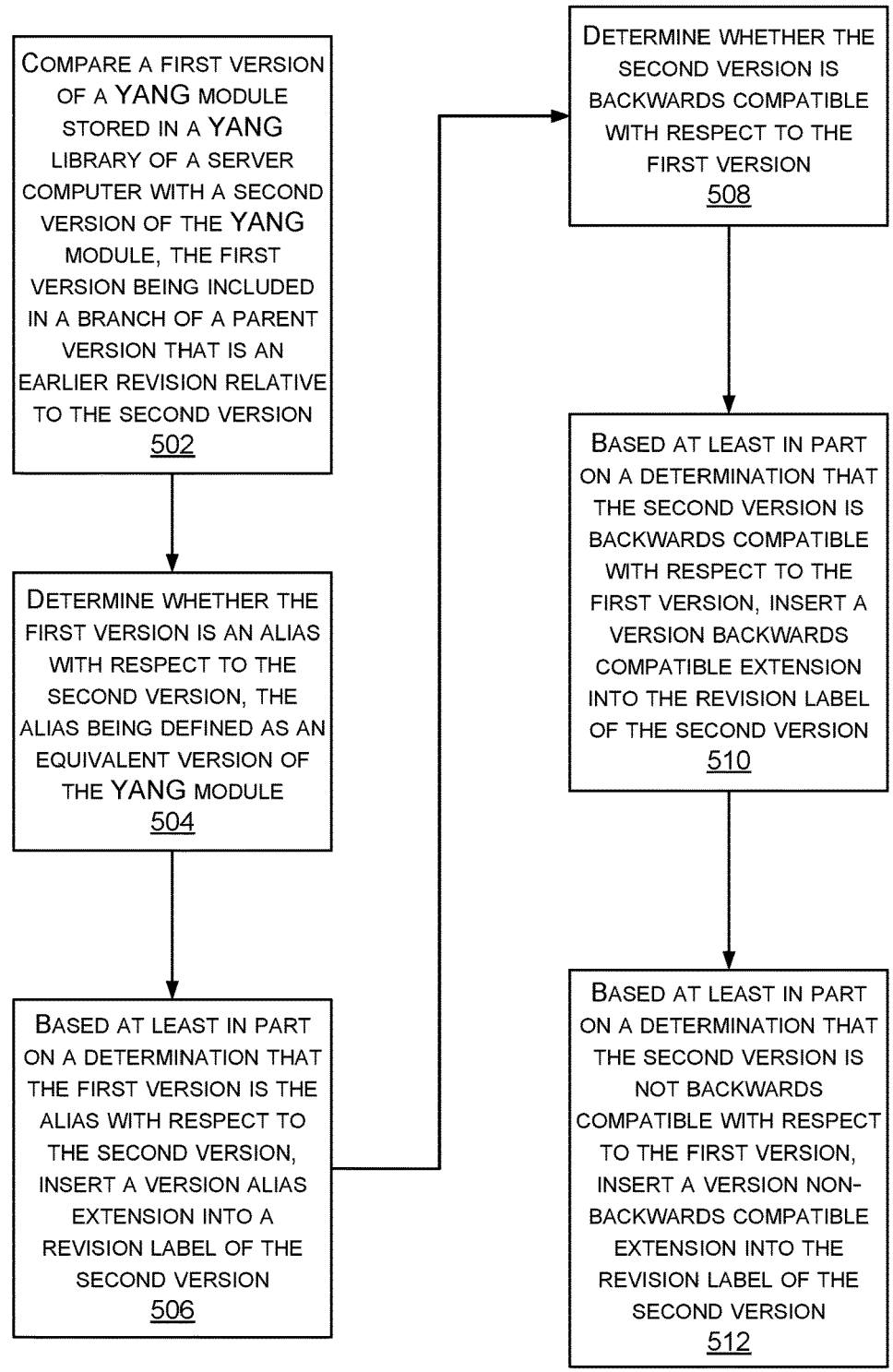
FIG. 5 illustrates a flow diagram of an example method for of creating a version alias extension and a version backwards compatible extension of a revision label, according to an example of the principles described herein.

FIG. 5 illustrates a flow diagram of an example method 500 for of creating a version alias extension and a version backwards compatible extension of a revision label, according to an example of the principles described herein. At 502, the alias identification component 322 and/or the backwards compatibility component 324 may be executed by the processor(s) 302 of the NMS 106 in order to compare a first version of a YANG module stored in a YANG library (e.g., as YANG library data 312) of the NMS 106 with a second version of the YANG module. The first version may be included in a branch of a parent version that is an earlier revision relative to the second version. The alias identification component 322 may be executed by the processor(s) 302 of the NMS 106 at 504 to determine whether the first version is an alias with respect to the second version. As described above, the alias may be defined as an equivalent version of the YANG module with respect to another YANG module version.

At 506 and based at least in part on a determination that the first version is an alias with respect to the second version, the processor(s) 302 of the NMS 106 may execute the alias identification component 322 to insert a version alias extension into a revision label of the second version. In an example where the execution of the alias identification component 322 results in a determination that the second version is released before the first version (after such a determination is executed), the alias identification component 322 may cause the YANG library to be augmented to include a leaf list including the version alias extension.

In one example, the execution of the alias identification component 322 may also cause the revision label including the version alias extension to be stored in the YANG library (e.g., as YANG library data 312 within the data store 308 of the NMS 106) in association with at least one of the first version and/or the second version. A YANG module version tree, may also be defined through the execution of the alias identification component 322 where the YANG module version tree 400 includes an indication of the version alias extension of the revision label. The alias identification component 322 may also, once executed, transmit the revision label including the version alias extension to at least one network device 102 communicatively coupled to the NMS 106. The network devices 102 may store the revision label including the version alias extension in their respective data stores 208 as version alias extension data 216 of the revision label data 214 of the YANG library data 212. Further, as mentioned above, the version alias extension may include a plurality of version alias extensions inserted into the revision label.

Returning again to FIG. 5, at 508, the backwards compatibility component 324 may be executed by the processor(s) 302 of the NMS 106 to determining whether the second version of the YANG module is backwards compatible with respect to the first version of the YANG module. Based at least in part on a determination that the second version is backwards compatible with respect to the first version, at 510 the execution of the backwards compatibility component 324 may cause a version backwards compatible extension to be inserted into the revision label of the second version. At 512, the backwards compatibility component 324 may insert a version non-backwards compatible extension into the revision label of the second version based at least in part on a determination that the second version is not backwards compatible with respect to the first version. In an example where the execution of the backwards compatibility component 324 results in a determination that the second version is released before the first version (after such a determination is executed), the backwards compatibility component 324 may cause the YANG library to be augmented to include a leaf list including the version backwards compatible extension and/or the version non-backwards compatible extension.

In one example, execution of the backwards compatibility component 324 may further cause the revision label including the version backwards compatible extension and/or the version non-backwards compatible extension to be stored in the YANG library in association with at least one of the first version or the second version. Further, a YANG module version tree including an indication of the version backwards compatible extension and/or the version non-backwards compatible extension of the revision label maybe defined through execution of the backwards compatibility component 324 by the processor(s) 302 of the NMS 106. The backwards compatibility component 324, once executed, may also cause the revision label including the version backwards compatible extension and/or the version non-backwards compatible extension to be transmitted to at least one network device 102 communicatively coupled to the NMS 106. The network devices 102 may store the revision label including the version backwards compatible extension and/or the version non-backwards compatible extension in their respective data stores 208 as version backwards compatible extension data 218 of the revision label data 214 of the YANG library data 212. As mentioned above, the version backwards compatible extension and/or the version non-backwards compatible extension may include a plurality of version backwards compatible extensions and/or a plurality of version non-backwards compatible extensions inserted into the revision label.

Figure 6:
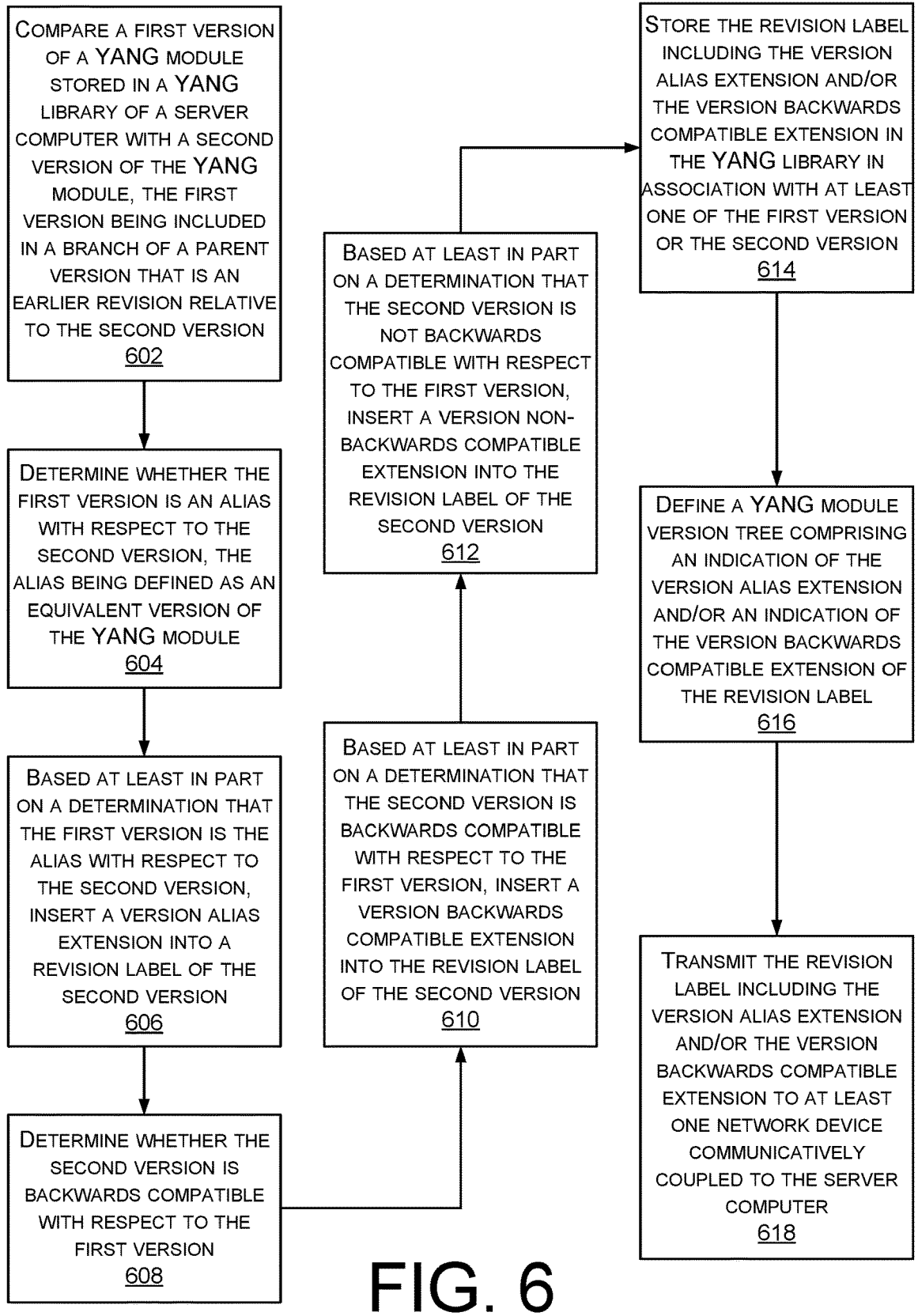
FIG. 6 illustrates a flow diagram of an example method for of creating a version alias extension and a version backwards compatible extension of a revision label, according to an example of the principles described herein.

FIG. 6 illustrates a flow diagram of an example method 600 for of creating a version alias extension and a version backwards compatible extension of a revision label, according to an example of the principles described herein. The method 600 may include, at 602, executing by the processor(s) 302 of the NMS 106 the alias identification component 322 and/or the backwards compatibility component 324 in order to compare a first version of a YANG module stored in a YANG library (e.g., as YANG library data 312) of the NMS 106 with a second version of the YANG module. The comparison at 602 allows both the alias identification component 322 and the backwards compatibility component 324 to perform their respective as described herein. At 606 and based at least in part on a determination that the first version is an alias with respect to the second version, the processor(s) 302 of the NMS 106 may execute the alias identification component 322 to insert a version alias extension into a revision label of the second version.

Returning again to FIG. 6, at 608, the backwards compatibility component 324 may be executed by the processor(s) 302 of the NMS 106 to determining whether the second version of the YANG module is backwards compatible with respect to the first version of the YANG module. Based at least in part on a determination that the second version is backwards compatible with respect to the first version, at 610 the execution of the backwards compatibility component 324 may cause a version backwards compatible extension to be inserted into the revision label of the second version. At 612, the backwards compatibility component 324 may insert a version non-backwards compatible extension into the revision label of the second version based at least in part on a determination that the second version is not backwards compatible with respect to the first version.

At 614, the method 600 may further include execution of the alias identification component 322 and/or the backwards compatibility component 324 to cause the revision label including the version alias extension, the version backwards compatible extension, and/or the version non-backwards compatible extension to be stored in the YANG library in association with at least one of the first version or the second version. Further, at 616, a YANG module version tree including an indication of the version alias extension, the version backwards compatible extension, and/or the version non-backwards compatible extension of the revision label maybe defined through execution of the alias identification component 322 and/or backwards compatibility component 324 by the processor(s) 302 of the NMS 106.

The alias identification component 322 and/or the backwards compatibility component 324, once executed, may also cause the revision label including the version alias extension, the version backwards compatible extension, and/or the version non-backwards compatible extension to be transmitted to at least one network device 102 communicatively coupled to the NMS 106. The network devices 102 may store the revision label including the version alias extension, version backwards compatible extension, and/or the version non-backwards compatible extension in their respective data stores 208 as version alias extension data 216 and/or version backwards compatible extension data 218 of the revision label data 214 of the YANG library data 212.

Figure 7:
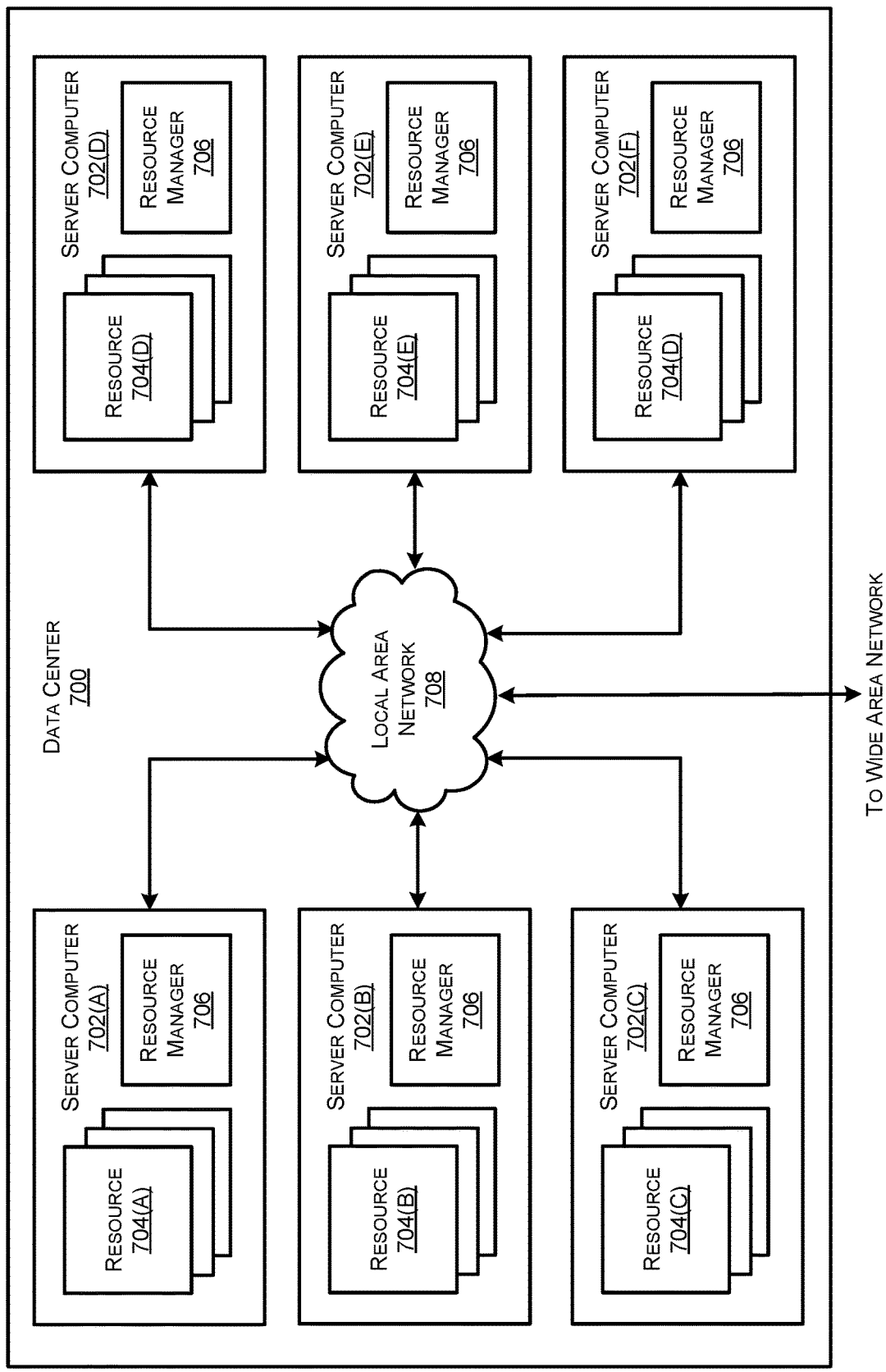
FIG. 7 illustrates a computing system diagram illustrating a configuration for a data center that may be utilized to implement aspects of the technologies disclosed herein.

FIG. 7 illustrates a computing system diagram illustrating a configuration for a data center 700 that may be utilized to implement aspects of the technologies disclosed herein. The example data center 700 shown in FIG. 7 includes several server computers 702A-702F (which might be referred to herein singularly as "a server computer 702" or in the plural as "the server computers 702) for providing computing resources. In some examples, the resources and/or server computers 702 may include, or correspond to, any type of networked device described herein. Although described as servers, the server computers 702 may comprise any type of networked device, such as servers, switches, routers, hubs, bridges, gateways, modems, repeaters, access points, etc.

The server computers 702 may be standard tower, rack-mount, or blade server computers configured appropriately for providing computing resources. In some examples, the server computers 702 may provide computing resources 704 including data processing resources such as virtual machine (VM) instances or hardware computing systems, database clusters, computing clusters, storage clusters, data storage resources, database resources, networking resources, virtual private networks (VPNs), and others. Some of the server computers 702 may also be configured to execute a resource manager 706 capable of instantiating and/or managing the computing resources. In the case of VM instances, for example, the resource manager 706 may be a hypervisor or another type of program configured to enable the execution of multiple VM instances on a single server computer 702. Server computers 702 in the data center 700 may also be configured to provide network services and other types of services.

In the example data center 700 shown in FIG. 7, an appropriate LAN 708 is also utilized to interconnect the server computers 702A-702F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 700, between each of the server computers 702A-702F in each data center 700, and, potentially, between computing resources in each of the server computers 702. It may be appreciated that the configuration of the data center 700 described with reference to FIG. 7 is merely illustrative and that other implementations may be utilized.

In some examples, the server computers 702 and or the computing resources 704 may each execute/host one or more tenant containers and/or virtual machines to perform techniques described herein.

In some instances, the data center 700 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 704 provided by the cloud computing network may include various types of computing resources, such as data processing resources like tenant containers and VM instances, data storage resources, networking resources, data communication resources, network services, VPN instances, and the like.

Each type of computing resource 704 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 704 not mentioned specifically herein.

The computing resources 704 provided by a cloud computing network may be enabled in one example by one or more data centers 700 (which might be referred to herein singularly as "a data center 700" or in the plural as "the data centers 700). The data centers 700 are facilities utilized to house and operate computer systems and associated components. The data centers 700 typically include redundant and backup power, communications, cooling, and security systems. The data centers 700 may also be located in geographically disparate locations. One illustrative example for a data center 700 that may be utilized to implement the technologies disclosed herein is described herein with regard to, for example, FIGS. 1 through 6.

Figure 8:
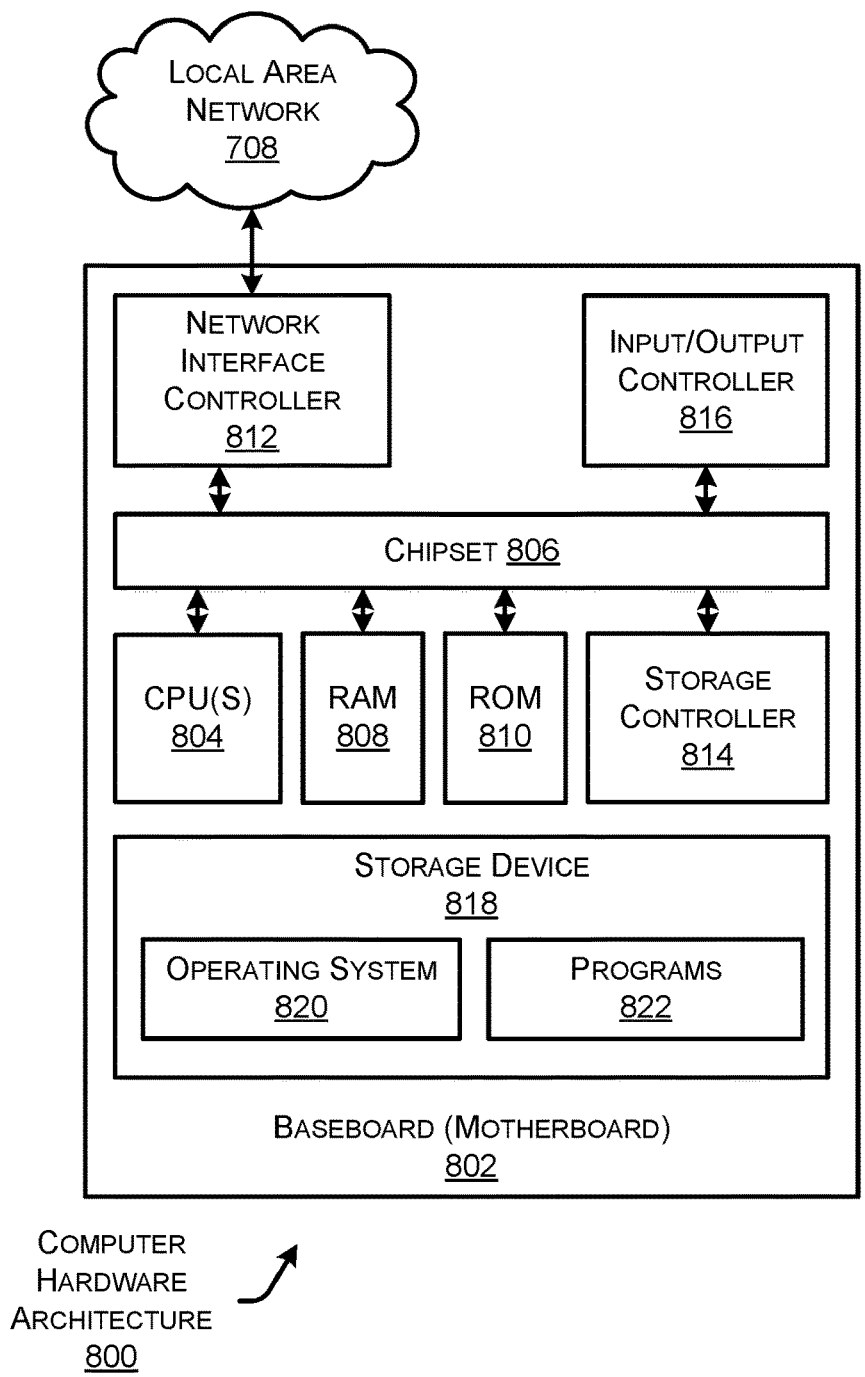
FIG. 8 illustrates a computer architecture diagram showing an example computer hardware architecture for implementing a computing device that may be utilized to implement aspects of the various technologies presented herein.

FIG. 8 illustrates a computer architecture diagram showing an example computer hardware architecture 800 for implementing a computing device that may be utilized to implement aspects of the various technologies presented herein. The computer hardware architecture 800 shown in FIG. 8 illustrates the network device 102, the servers 104, the NMS 106, the network 108, and/or other systems or devices associated with the NMS 106 and/or remote from the NMS 106, a workstation, a desktop computer, a laptop, a tablet, a network appliance, an e-reader, a smartphone, or other computing device, and may be utilized to execute any of the software components described herein. The computer 800 may, in some examples, correspond to a network device (e.g., network device 102, the servers 104, the NMS 106, the network 108, and associated devices described herein, and may comprise networked devices such as servers, switches, routers, hubs, bridges, gateways, modems, repeaters, access points, etc.

The computer 800 includes a baseboard 802, or "motherboard," which is a printed circuit board to which a multitude of components or devices may be connected by way of a system bus or other electrical communication paths. In one illustrative configuration, one or more central processing units (CPUs) 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory (ROM) 810 or non-volatile RAM (NVRAM) for storing basic routines that help to startup the computer 800 and to transfer information between the various components and devices. The ROM 810 or NVRAM may also store other software components necessary for the operation of the computer 800 in accordance with the configurations described herein.

The computer 800 may operate in a networked environment using logical connections to remote computing devices and computer systems through a network, such as the network device 102, the servers 104, the NMS 106, and the network 108, among other devices. The chipset 806 may include functionality for providing network connectivity through a Network Interface Controller (NIC) 812, such as a gigabit Ethernet adapter. The NIC 812 is capable of connecting the computer 800 to other computing devices within the network management system 100 and external to the network management system 100. It may be appreciated that multiple NICs 812 may be present in the computer 800, connecting the computer to other types of networks and remote computer systems. In some examples, the NIC 812 may be configured to perform at least some of the techniques described herein, such as packet redirects and/or other techniques described herein.

The computer 800 may be connected to a storage device 818 that provides non-volatile storage for the computer. The storage device 818 may store an operating system 820, programs 822 (e.g., any computer-readable and/or computer-executable code described herein), and data, which have been described in greater detail herein. The storage device 818 may be connected to the computer 800 through a storage controller 814 connected to the chipset 806. The storage device 818 may consist of one or more physical storage units. The storage controller 814 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 800 may store data on the storage device 818 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 818 is characterized as primary or secondary storage, and the like.

For example, the computer 800 may store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the storage device 818 by detecting the physical states or characteristics of one or more particular locations within the physical storage units.

In addition to the storage device 818 described above, the computer 800 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 800. In some examples, the operations performed by the network device 102, the servers 104, the NMS 106, the network 108, and/or any components included therein, may be supported by one or more devices similar to computer 800. Stated otherwise, some or all of the operations performed by the network device 102, the servers 104, the NMS 106, the network 108, and/or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 818 may store an operating system 820 utilized to control the operation of the computer 800. According to one example, the operating system 820 comprises the LINUX operating system. According to another example, the operating system comprises the WINDOWS® SERVER operating system from MICROSOFT Corporation of Redmond, Wash. According to further examples, the operating system may comprise the UNIX operating system or one of its variants. It may be appreciated that other operating systems may also be utilized. The storage device 818 may store other system or application programs and data utilized by the computer 800.

In one example, the storage device 818 or other computer-readable storage media is encoded with computer-executable instructions which, when loaded into the computer 800, transform the computer from a general-purpose computing system into a special-purpose computer capable of implementing the examples described herein. These computer-executable instructions transform the computer 800 by specifying how the CPUs 804 transition between states, as described above. According to one example, the computer 800 has access to computer-readable storage media storing computer-executable instructions which, when executed by the computer 800, perform the various processes described above with regard to FIGS. 1 through 6. The computer 800 may also include computer-readable storage media having instructions stored thereupon for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, an input/output controller 816 may provide output to a display, such as a computer monitor, a flat-panel display, a digital projector, a printer, or other type of output device. It will be appreciated that the computer 800 might not include all of the components shown in FIG. 8, may include other components that are not explicitly shown in FIG. 8, or might utilize an architecture completely different than that shown in FIG. 8.

As described herein, the computer 800 may comprise one or more of the network device 102, the servers 104, the NMS 106, the network 108, and/or other systems or devices associated with the NMS 106 and/or remote from the NMS 106. The computer 800 may include one or more hardware processor(s) such as the CPUs 804 configured to execute one or more stored instructions. The CPUs 804 may comprise one or more cores. Further, the computer 800 may include one or more network interfaces configured to provide communications between the computer 800 and other devices, such as the communications described herein as being performed by the network device 102, the servers 104, the NMS 106, the network 108, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth. The programs 822 may comprise any type of programs or processes to perform the techniques described in this disclosure for the network device 102, the servers 104, the NMS 106, the network 108 as described herein. The programs 822 may enable the devices described herein to perform various operations.

CONCLUSION

The examples described herein provide systems, methods, and non-transitory computer readable medium that provide for determining whether the first version is an alias with respect to the second version, the alias being defined as an equivalent version of the YANG module. Based at least in part on a determination that the first version is the alias with respect to the second version, a version alias extension is inserted into a revision label of the second version. Based on a determination that the second version is backwards compatible with respect to the first version, a version backwards compatible extension is inserted into the revision label of the second version. Based at least in part on a determination that the second version is not backwards compatible with respect to the first version, a version non-backwards compatible extension is inserted into the revision label of the second version.

With the above-described systems, methods, and non-transitory computer readable medium provides for a network device and/or human user to see alias and backwards compatible schema between different versions or revisions of a YANG module which may otherwise require a time-consuming schema comparison.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method comprising:
   with a server computer:
      comparing a first version of a YANG module stored in a YANG library of the server computer with a second version of the YANG module, the first version being included in a branch of a parent version that is an earlier revision relative to the second version;
      determining whether the first version is an alias with respect to the second version, the alias being defined as an equivalent version of the YANG module; and
      based at least in part on a determination that the first version is the alias with respect to the second version, inserting a version alias extension into a revision label of the second version.

2. The method of claim 1, further comprising storing the revision label including the version alias extension in the YANG library in association with at least one of the first version or the second version.

3. The method of claim 1, further comprising defining a YANG module version tree, the YANG module version tree comprising an indication of the version alias extension of the revision label.

4. The method of claim 1, further comprising transmitting the revision label including the version alias extension to at least one network device communicatively coupled to the server computer.

5. The method of claim 1, wherein the version alias extension includes a plurality of version alias extensions inserted into the revision label.

6. The method of claim 1, further comprising:
   determining whether the second version is released before the first version; and
   based at least in part on a determination that the second version is released before the first version, augmenting the YANG library including a leaf list including the version alias extension.

7. The method of claim 1, further comprising:
   determining whether the second version is backwards compatible with respect to the first version; and
   based at least in part on a determination that the second version is backwards compatible with respect to the first version, inserting a version backwards compatible extension into the revision label of the second version; and
   based at least in part on a determination that the second version is not backwards compatible with respect to the first version, inserting a version non-backwards compatible extension into the revision label of the second version.

8. The method of claim 7, further comprising storing the revision label including the version backwards compatible extension and the version non-backwards compatible extension in the YANG library in association with at least one of the first version or the second version.

9. The method of claim 7, further comprising defining a YANG module version tree, the YANG module version tree comprising an indication of the version backwards compatible extension and the version non-backwards compatible extension of the revision label.

10. The method of claim 7, further comprising transmitting the revision label including the version backwards compatible extension and the version non-backwards compatible extension to at least one network device communicatively coupled to the server computer.

11. The method of claim 7, wherein the version backwards compatible extension and the version non-backwards compatible extension includes a plurality of version backwards compatible extensions and a plurality of version non-backwards compatible extensions inserted into the revision label.

12. The method of claim 7, further comprising:
    determining whether the second version is released before the first version; and
    based at least in part on a determination that the second version is released before the first version, augmenting the YANG library including a leaf list including the version backwards compatible extension and the version non-backwards compatible extension.

13. A non-transitory computer-readable medium storing instructions that, when executed, causes a processor to perform operations, comprising:
    comparing a first version of a YANG module stored in a YANG library of a server computer with a second version of the YANG module, the first version being included in a branch of a parent version that is an earlier revision relative to the second version;
    determining whether the first version is an alias with respect to the second version, the alias being defined as an equivalent version of the YANG module; and
    based at least in part on a determination that the first version is the alias with respect to the second version, inserting a version alias extension into a revision label of the second version.

14. The non-transitory computer-readable medium of claim 13, the operations further comprising:
    determining whether the second version is backwards compatible with respect to the first version; and
    based at least in part on a determination that the second version is backwards compatible with respect to the first version, inserting a version backwards compatible extension into a revision label of the second version; and
    based at least in part on a determination that the second version is not backwards compatible with respect to the first version, inserting a version non-backwards compatible extension into the revision label of the second version.

15. The non-transitory computer-readable medium of claim 14, the operations further comprising:
    storing the revision label including the version backwards compatible extension in the YANG library in association with at least one of the first version or the second version;
    defining a YANG module version tree, the YANG module version tree comprising an indication of the version backwards compatible extension of the revision label; and
    transmitting the revision label including the version backwards compatible extension to at least one network device communicatively coupled to the server computer.

16. A server comprising:
one or more processors; and
one or more non-transitory computer-readable media storing instructions that, when executed by the one or more processors, cause the one or more processors to perform operations comprising:
- comparing a first version of a YANG module stored in a YANG library of a server computer with a second version of the YANG module, the first version being included in a branch of a parent version that is an earlier revision relative to the second version;
- determining whether the first version is an alias with respect to the second version, the alias being defined as an equivalent version of the YANG module;
- based at least in part on a determination that the first version is the alias with respect to the second version, inserting a version alias extension into a revision label of the second version;
- determining whether the second version is backwards compatible with respect to the first version; and
- based at least in part on a determination that the second version is backwards compatible with respect to the first version, inserting a version backwards compatible extension into the revision label of the second version; and
- based at least in part on a determination that the second version is not backwards compatible with respect to the first version, inserting a version non-backwards compatible extension into the revision label of the second version.

17. The server of claim 16, wherein the server is a network management server configured to manage a network device based at least in part on the revision label.

18. The server of claim 16, the operations further comprising:
defining a YANG module version tree, the YANG module version tree comprising:
- an indication of the version alias extension of the revision label; and
- an indication of the version backwards compatible extension of the revision label; and
transmitting the YANG module version tree to a network device communicatively coupled to the server.

19. The server of claim 16, the operations further comprising:
- determining whether the second version is released before the first version; and
- based at least in part on a determination that the second version is released before the first version, augmenting the YANG library including a leaf list including the version alias extension.

20. The server of claim 16, the operations further comprising:
- determining whether the second version is released before the first version; and
- based at least in part on a determination that the second version is released before the first version, augmenting the YANG library including a leaf list including the version backwards compatible extension.

* * * * *